United States Patent
Cho et al.

(10) Patent No.: US 8,089,182 B2
(45) Date of Patent: Jan. 3, 2012

(54) IMAGE FORMING APPARATUS

(75) Inventors: Hyun Ki Cho, Hanam-Si (KR); Jong Woo Kim, Yongin-Si (KR); Young Jae Park, Yongin-Si (KR); Sang Pil Yoon, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 384 days.

(21) Appl. No.: 12/346,291

(22) Filed: Dec. 30, 2008

(65) Prior Publication Data
US 2009/0179513 A1 Jul. 16, 2009

(30) Foreign Application Priority Data
Jan. 10, 2008 (KR) .................. 10-2008-0003075

(51) Int. Cl.
*H02K 5/24* (2006.01)
(52) U.S. Cl. ............ 310/51; 310/91; 399/167; 248/560
(58) Field of Classification Search .................. 310/91, 310/51; 399/167; 248/560; H02K 5/00, H02K 5/24
See application file for complete search history.

(56) References Cited

U.S. PATENT DOCUMENTS

| | | | | |
|---|---|---|---|---|
| 4,806,437 A * | 2/1989 | Yokoi et al. | .................... | 428/623 |
| 5,020,767 A * | 6/1991 | Ueda et al. | .................... | 248/638 |
| 5,280,309 A * | 1/1994 | Zinsmeyer et al. | ........ | 346/139 R |
| 6,107,706 A * | 8/2000 | Neckermann et al. | .......... | 310/51 |
| 6,285,099 B1 * | 9/2001 | Takami | ............................ | 310/51 |
| 6,328,274 B1 * | 12/2001 | Hayashi | ......................... | 248/638 |
| 6,478,838 B2 * | 11/2002 | McSweeney et al. | ........... | 55/467 |
| 6,498,917 B2 * | 12/2002 | Takami | .......................... | 399/227 |
| 6,557,816 B2 * | 5/2003 | Yoshida | ........................ | 248/674 |
| 2002/0066611 A1 * | 6/2002 | Lane et al. | ..................... | 180/228 |
| 2005/0094218 A1 * | 5/2005 | Ando | ............................. | 358/474 |
| 2007/0280733 A1 * | 12/2007 | Shiraki et al. | ................. | 399/113 |
| 2008/0179513 A1 * | 7/2008 | Laprade et al. | ................ | 250/288 |
| 2008/0238231 A1 * | 10/2008 | Carter et al. | ..................... | 310/91 |
| 2009/0045685 A1 * | 2/2009 | Yoon et al. | ...................... | 310/51 |
| 2009/0179513 A1 * | 7/2009 | Cho et al. | ........................ | 310/91 |

FOREIGN PATENT DOCUMENTS
JP 2000-074133 3/2000

OTHER PUBLICATIONS

English language abstract of JP 2000-074133, published Mar. 7, 2000.
Machine English language translation of JP 2000-074133, published Mar. 7, 2000.

* cited by examiner

*Primary Examiner* — Quyen Leung
*Assistant Examiner* — John K Kim
(74) *Attorney, Agent, or Firm* — Stanzione & Kim, LLP

(57) ABSTRACT

A motor assembly to minimize deformation of a vibration-proof member and to achieve stable motor mounting configuration, as well as an image forming apparatus employing the motor assembly, are disclosed. The motor assembly includes a motor, a fixing member to which the motor is fixed, a vibration-proof member provided between the motor and the fixing member to prevent vibration of the motor from being transmitted to the fixing member, and a reinforcing piece having a predetermined strength to prevent relative movement between the motor and the fixing member.

18 Claims, 7 Drawing Sheets

(a)

(b)

(c)

IMAGE FORMING APPARATUS

CROSS-REFERENCE TO RELATED APPLICATION

This application claims the benefit of Korean Patent Application No. 2008-0003075, filed on Jan. 10, 2008 in the Korean Intellectual Property Office, the disclosure of which is incorporated herein by reference.

BACKGROUND OF THE INVENTION

1. Field of the Invention

The present invention relates to an image forming apparatus, and, more particularly, to an image forming apparatus, which includes a motor assembly capable of preventing vibration of a motor from being transmitted to an adjacent structure.

2. Description of the Related Art

Motors are commonly found in image forming devices such as, e.g., copiers, printers, facsimiles, scanners, or the like, in which they are used to drive a variety of moving parts. These motors are installed at appropriate positions to provide drive forces required to achieve desired purposes. Generally, a single motor assembly includes a motor fixed to a fixing member, and the motor assembly is installed within a body of the image forming apparatus.

FIG. 1 is a perspective view illustrating an example of a motor assembly. The motor assembly 1 includes a motor 2, a fixing member 3 to keep the motor 2 at a fixed position, and vibration-proof members 4 provided between the motor 2 and the fixing member 3 to prevent vibration of the motor 2 from being transmitted to the fixing member 3. The motor 2 is provided with a pair of flanges 2a. Screws are fastened through the flanges 2a to couple the motor 2 and the vibration-proof members 4 to each other. The vibration-proof members 4 have an approximately cylindrical form, and are formed with fastening holes at their upper and lower surfaces for fastening of the screws. The fixing member 3 has a gear fixing portion (not shown), to which gears 5 are rotatably fixed. The gears 5 are engaged with a rotating shaft of the motor 2.

While the above-described motor mounting configuration employed in an image forming apparatus has some use for preventing vibration of the motor from being transmitted to the fixing member, it is ineffective in preventing the relative movement between the motor and the fixing member due to the load placed on the motor shaft by the plurality of gears. This relative movement of the motor can cause deformation of the vibration-proof members, which are made of material having a low rigidity, e.g., rubber. The deformed vibration-proof members may transmit vibration of the motor to the fixing member. The transmitted vibration shifts the rotating shaft of the motor, resulting in deformation or breakage of gear teeth, etc., and poor reliability of the image forming apparatus. Additionally, due to the plurality of gears coupled to the gear fixing portion, vibration caused during operation of the gears is transmitted to the fixing member via the gear fixing portion, and consequently, is transmitted to a body of the image forming apparatus coupled with the fixing member.

BRIEF DESCRIPTION OF THE DRAWINGS

Various aspects and advantages of the embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
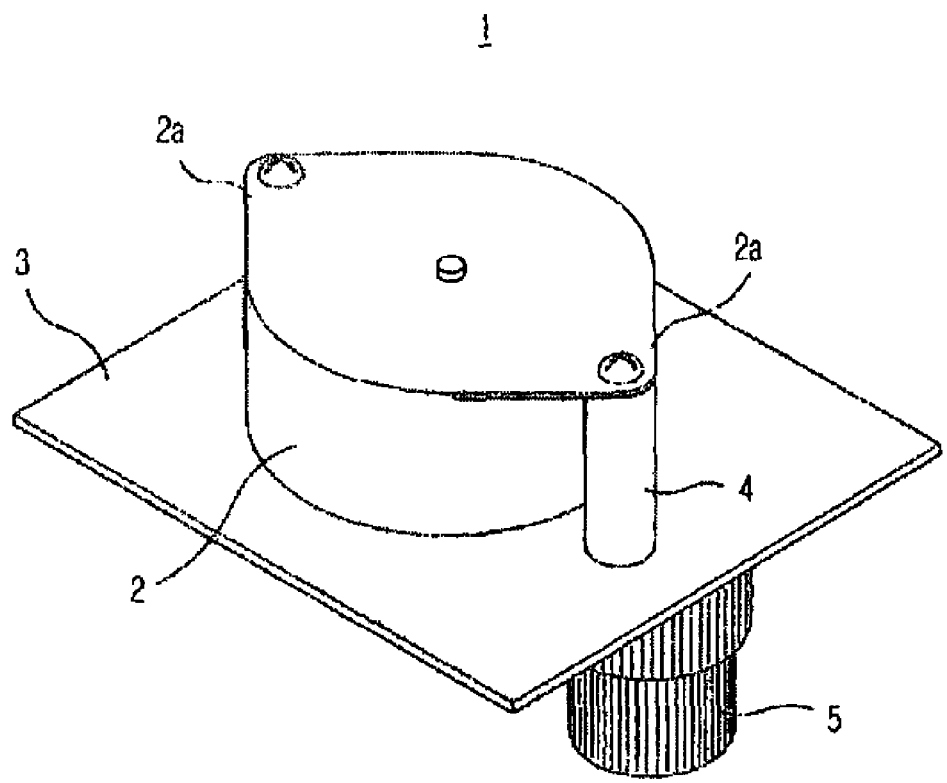
FIG. 1 is a perspective view illustrating a motor assembly conventionally used in an image forming apparatus.

Reference will now be made in detail to exemplary embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

Figure 2:
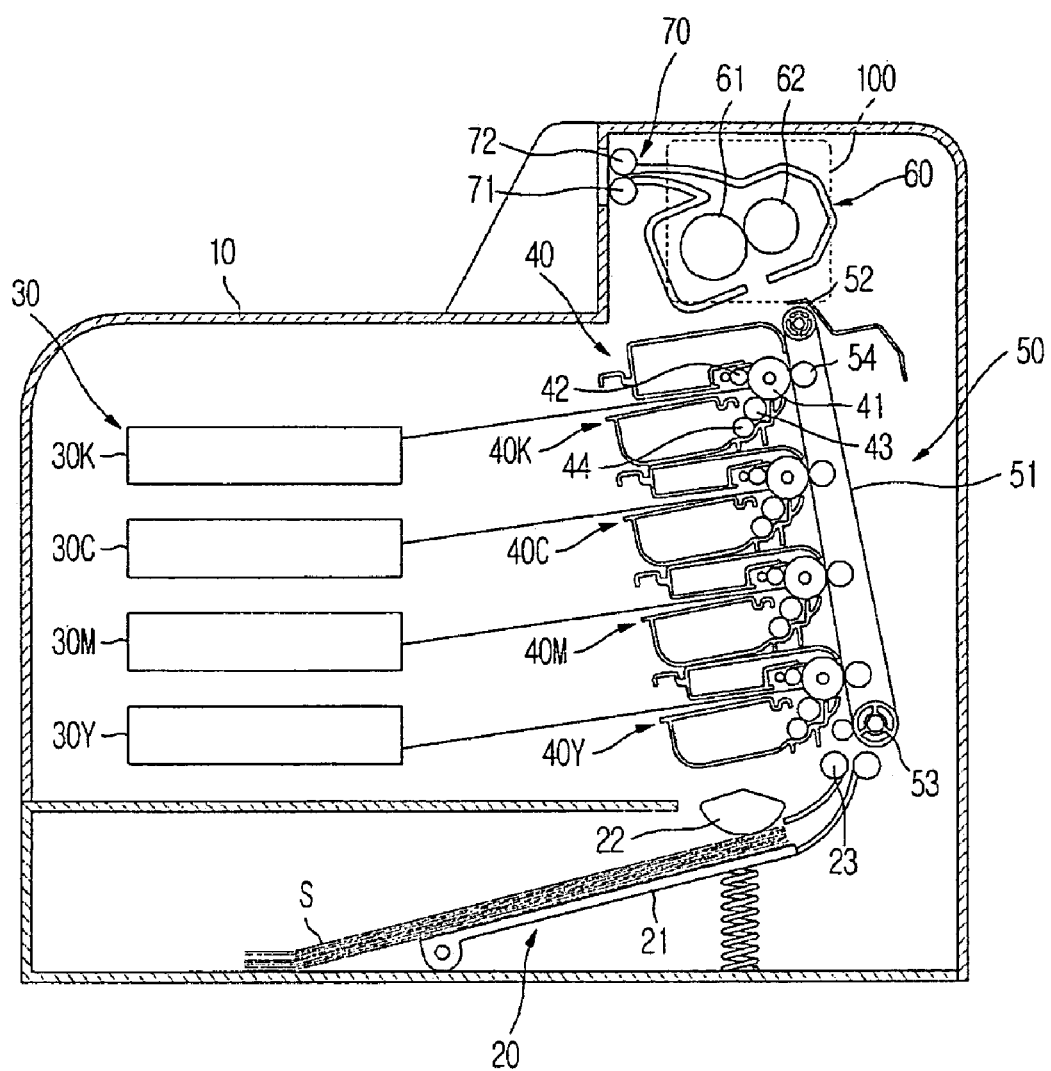
FIG. 2 is a configuration view illustrating an image forming apparatus in accordance with an embodiment of the invention.

As shown in FIG. 2, an image forming apparatus may include a main body 10, which defines an exterior appearance, and which supports internally mounted components. The internally mounted components within the main body 10 may vary, but for illustration of an embodiment of the invention, a paper supply device 20, a light scanning device 30, a developing device 40, a transfer device 50, a fixing device 60, and a paper discharge device 70 may be mounted inside the main body 10.

The paper supply device 20 may supply a printing medium, such as paper S, to the developing device 40. The paper supply device 20 may include a paper supply tray 21 in which the printing medium may be loaded, and a pickup roller 22 to pick up the printing medium loaded in the paper supply tray 21. The paper S, picked up by the pickup roller 22, may be delivered to the developing device 40 by a delivery roller 23.

According to an embodiment, the developing device 40 may include four developing units 40Y, 40M, 40C, and 40K. The developing units may receive different colors of toners, for example, yellow toner Y, magenta toner M, cyan toner C, and black toner K, respectively. Each of the developing units 40Y, 40M, 40C, and 40K may include a photosensitive member 41, a surface of which may be formed with an electrostatic latent image via operation of the light scanning device 30. The light scanning device 30 may include four light scanning units 30K, 30C, 30M, and 30Y to irradiate light. These light scanning units may each irradiate light according to yellow, magenta, cyan, and black image information, respectively.

Each of the developing units 40Y, 40M, 40C, and 40K may further include a charge roller 42 to charge the photosensitive member 41, a developing roller 43 to develop an electrostatic latent image formed on the photosensitive member 41 into a toner image, and a supply roller 44 to supply the toner to the developing roller 43.

The light scanning units 30K, 30C, 30M, and 30Y may irradiate light to the photosensitive members 41, whose surfaces have been charged with a potential by the charge roller 42, to cause electrostatic latent images to be formed on the surfaces of the photosensitive members 41.

The transfer device 50 may transfer the toner images developed on the respective photosensitive members 41 to the printing medium. The transfer device 50 may include a circulating transfer belt 51 in contact with the respective photosensitive members 41, a drive roller 52 to drive the transfer belt 51, a tension roller 53 to maintain a set tension of the transfer belt 51, and four transfer rollers 54 to transfer the toner images developed on the respective photosensitive members 41 to the printing medium.

The fixing device 60 may fix the images transferred to the printing medium by applying heat and pressure to the image. The fixing device 60 may include a heating roller 61 having a heating source to apply heat to the printing medium, on which the images were transferred, and a pressure roller 62 to press against the heating roller 61.

The paper discharge device 70 may discharge the printing medium, on which the image is fixed, to the outside of the body 10. The paper discharge device 70 may include a paper discharge roller 71 and a paper backup roller 72 installed opposite the paper discharge roller 71.

Many image forming apparatuses, such as the above-described unit, include motor assemblies to drive a variety of devices, for example, a paper supply device 20, developing device 40, transfer device 50, fixing device 60, and paper discharge device 70. The motor assemblies of the following descriptions are broadly applicable to the various devices. As shown in FIG. 2, by way of an example only, the following description will be made in reference to the motor assembly 100 for driving the fixing device 60.

Figure 3:
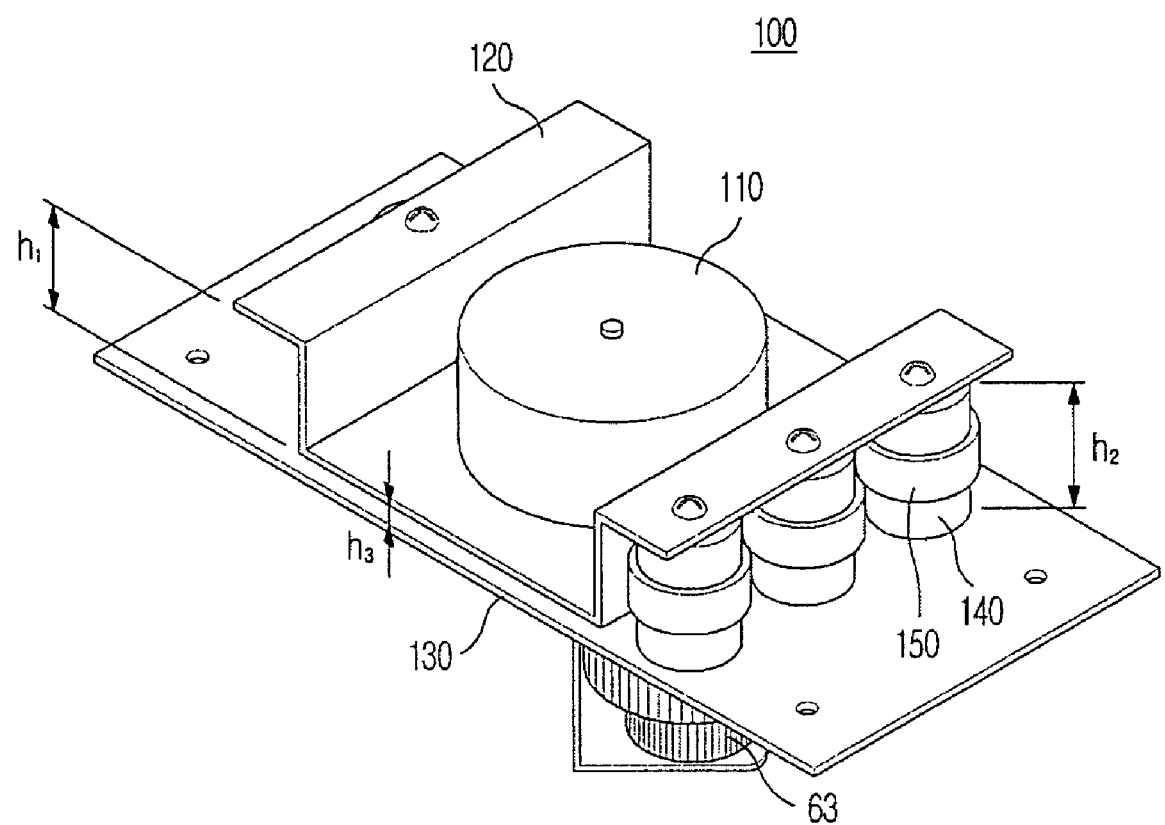
FIG. 3 is a perspective view illustrating a motor assembly provided in the image forming apparatus in accordance with an embodiment of the invention.
Figure 4:
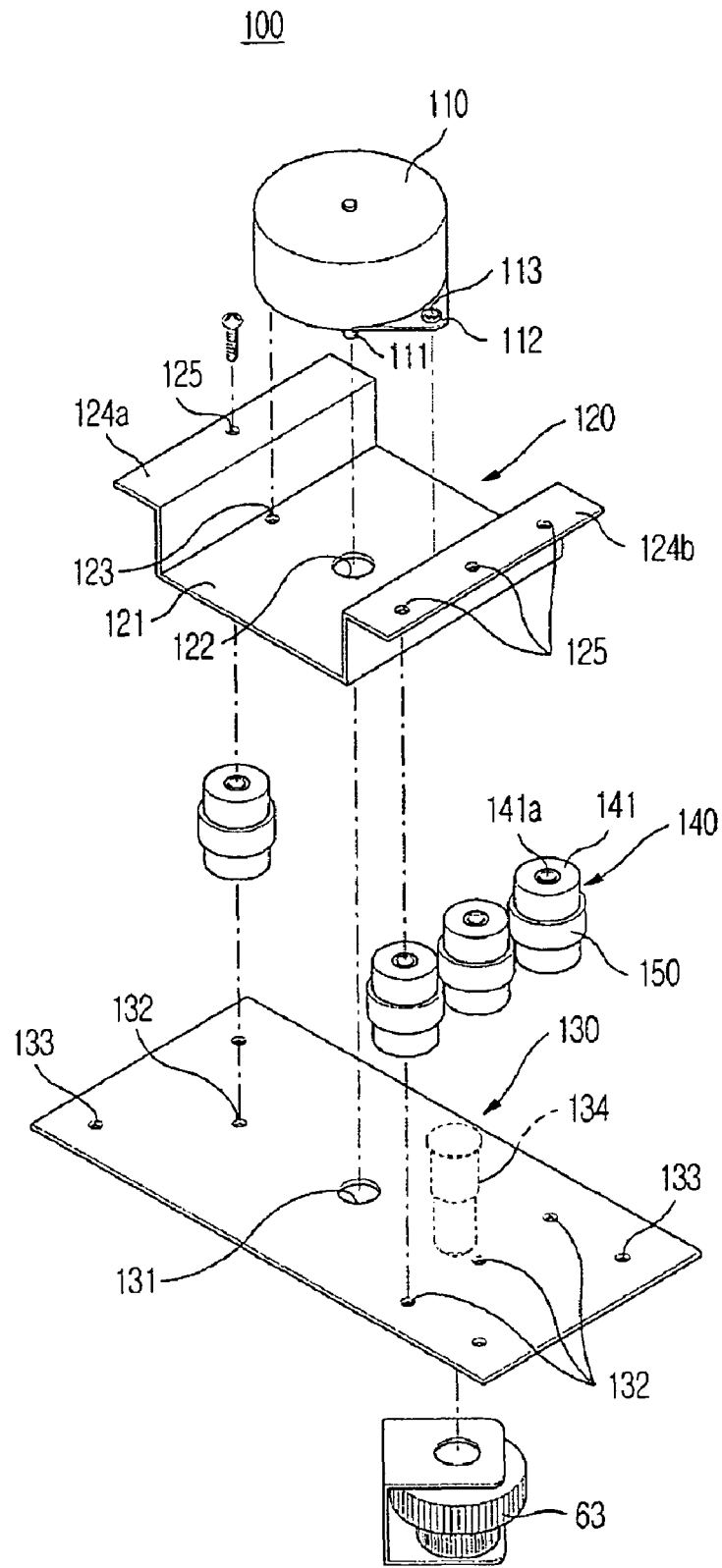
FIG. 4 is an exploded perspective view of FIG. 3.

FIGS. 3 and 4 depict a motor assembly 100 according to one embodiment of the invention. This motor assembly 100 may include a motor 110, a bracket 120 coupled with the motor 110, a fixing member 130 to keep the motor 110 at a fixed position, and first vibration-proof members 140 provided between the motor 110 and the fixing member 130 to prevent vibration of the motor 110 from being transmitted to the fixing member 130. The motor 110 may be a step motor, BLDC motor, or another motor type. The motor 110 may include a rotating shaft 111 and a plurality of flanges 112 to couple the motor 110 to the bracket 120. The flanges 112 may be formed with first screw holes 113 for fastening of screws, so that the motor 110 is fixed to the bracket 120 by use of screws, or the motor 110 and the bracket 120 may be fastened by other means.

The bracket 120 may include a bottom portion 121 and a pair of stepped portions 124. In one embodiment, the pair of stepped portions 124a and 124b may be formed by bending opposite edge portions of the bottom portion 121 upward and then bending distal end portions thereof. The bottom portion 121 may be formed with a first shaft hole 122 at a position corresponding to the rotating shaft 111 to accept the rotating shaft 111 of the motor 110. The bottom portion 121 may also have second screw holes 123, corresponding to the first screw holes 113 for fastening with screws. In an embodiment, in which screws are to be used to join the stepped portions 124 to the first vibration-proof members 140, the stepped portions 124 may have third screw holes 125 to allow the stepped portions 124 to be screw mounted to the top of the respective first vibration-proof members 140.

The motor assembly 100 may be fixed to an inner surface of the body 10. If the inner surface of the body 10 is a vertical surface, the bracket 120 could be deformed by the weight of the motor 110. To prevent deformation of the bracket 120, in an embodiment, preferably, a lager number of the first vibration-proof members 140 may be provided between the lower stepped portion 124b and the fixing member 130 than between the upper stepped portion 124a and the fixing member 130, to achieve stable fixing of the motor 110.

The fixing member 130 may have a second shaft hole 131 formed at a position corresponding to the rotating shaft 111 to accept the rotating shaft 111 of the motor 110. In an embodiment wherein screws are used for fastening, the fixing member 130 may have a plurality of fourth screw holes 132 to allow the fixing member 130 to be screwed to the bottom of the respective first vibration-proof members 140. Each corner of the fixing member 130 may be formed with a fifth screw hole 133, to allow the fixing member 130 to be screwed between the motor assembly 100 and the body 10. The fixing member 130 may be provided at a lower surface thereof with a downwardly protruding gear fixing portion 134. The gear fixing portion 134 serves to rotatably fix gears 63, which may be engaged with the rotating shaft 111 of the motor 110 to drive the fixing device 60.

The first vibration-proof members 140 may be provided between the motor 110 and the fixing member 130 to prevent the vibration of the motor 110 from being transmitted to the fixing member 130. A length $h_2$ of each first vibration-proof member 140 is longer than a height $h_1$ of the stepped portion 124 measured from the bottom portion 121 of the bracket 120. Therefore, the bottom portion 121 of the bracket 120, to which the motor 110 is fixed, is spaced apart from the fixing member 130 by a predetermined distance $h_3$ so as to prevent vibration of the motor 110 from being transmitted to the fixing member 130.

Each of the first vibration-proof members 140 may have, e.g., a substantially cylindrical shape, and may have a screw fastening piece 141. The screw fastening piece 141 may be centrally perforated with a fastening hole 141a to allow the first vibration-proof member 140 to be screwed to both the bracket 120, to which the motor 110 is coupled, and the fixing member 130. Preferably, to reinforce screw fastening rigidity, the screw fastening piece 141 may be made of, e.g., plastic, metal, or any other material having a relatively higher rigidity than the material of the first vibration-proof member 140.

That is, by mounting the motor 110 to the bracket 120 with the first vibration-proof members 140 interposed between the bracket 120 and the fixing member 130, it is possible to reduce transmission of vibration of the motor 110 to the fixing member 130.

In order to reduce the deformation of the first vibration-proof members 140, the motor assembly 100 may further include reinforcing pieces 150, which may consequently also reduce the relative movement between the motor 110 and the fixing member 130.

The reinforcing pieces may be provided as discrete elements between the bracket and the fixing member separate from the first vibration-proof members 140, or alternatively, as shown in FIG. 4, according to an embodiment, they may be provided on one or more of the first vibration-proof members 140.

The reinforcing piece 150 may be made of a resin material, for example, ABS resin, or any other material having a higher strength than the first vibration-proof member 140.

Figure 5:
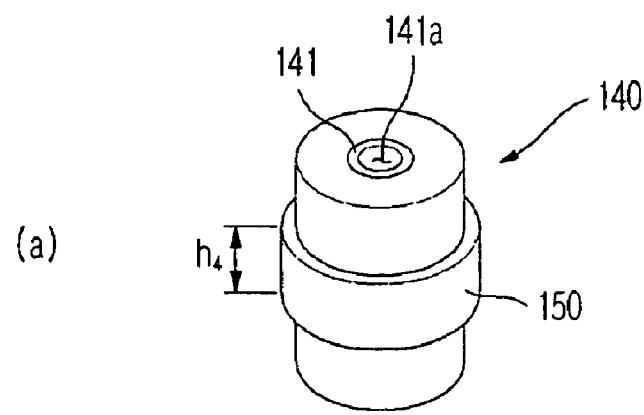
FIG. 5 a view illustrating different embodiments of vibration-proof members provided in the motor assembly of an embodiment of the invention.
Figure 5:
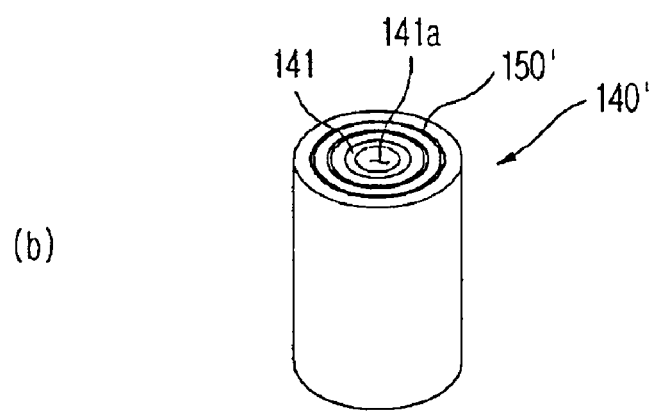
Figure 5:
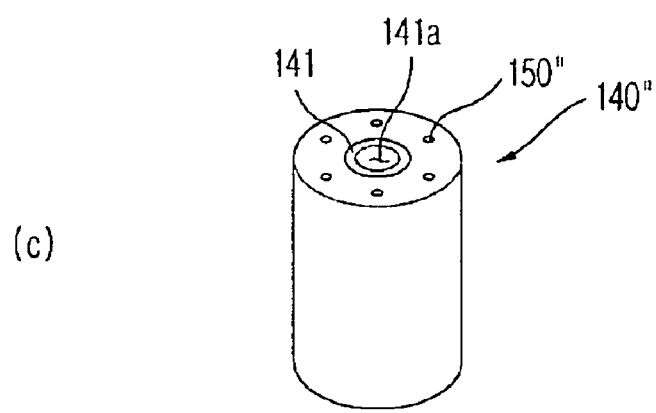

FIG. 5 depicts several examples of vibration-proof members. For example, in one embodiment as shown in FIG. 5A, the reinforcing piece 150 may have a predetermined length $h_4$, and may be configured to surround the outer circumference of the first vibration-proof member 140.

The greater the length of the reinforcing piece 150, the greater the contact area exists between the reinforcing piece 150 and the first vibration-proof member 140, and consequently, there will be a higher effect in preventing deformation of the first vibration-proof member 140. However, as the reinforcing piece 150 approaches the length of the first vibration-proof member 140, vibration of the motor 110 may be transmitted to the fixing member 130 via the reinforcing piece 150. Accordingly, it is preferable that the length of the reinforcing piece 150 be approximately 20~60% of the height of the first vibration-proof member 140. The reinforcing piece 150 may also preferably be coupled to a portion of the first vibration-proof member 140 where it is spaced apart from both the bracket 120 and the fixing member 130.

In another example of a first vibration-proof member 140' provided with one or more reinforcing piece 150', as shown in FIG. 5B, the reinforcing piece 150' may have a ring shape, and may be inserted in a partial region of the first vibration-proof member 140' between an outer surface of the screw fastening piece 141 and an outer circumference of the first vibration-proof member 140'.

In another example of a first vibration-proof member 140" provided with one or more reinforcing piece 150", as shown in FIG. 5C, the reinforcing piece 150" may have a shim shape, and may be inserted in the first vibration-proof member 140" around the screw fastening piece 141.

It should be understood that in the above examples, at least one reinforcing piece 150' or 150" provided in the first vibration-proof member 140' or 140" may reduce deformation of the first vibration-proof member 140' or 140" due to the load applied to the motor 110.

Accordingly, in the motor assembly 100 according to an embodiment, the motor 110 is first fixed to the bracket 120 with screws through the first screw holes 113 of the flanges 112 of the motor 110, and through the second screw holes 123 of the bracket 120. The first vibration-proof members 140, provided with the reinforcing pieces 150, may be screwed to lower surfaces of the stepped portions 124 and an upper surface of the fixing member 130 to fix the motor 110 to the fixing member 130. In such a configuration, the motor 110 and the fixing member 130 are spaced apart from each other, and thus, it is possible to reduce vibration of the motor 110 from being transmitted to the fixing member 130. The reinforcing pieces 150 at the first vibration-proof members 140 prevent the first vibration-proof members 140 from being deformed during operation of the motor 110. This consequently may have the effect of limiting the relative movement between the motor 110 and the fixing member 130.

Hereinafter, operation and configuration of mounting the above-described motor assembly to the body of an image forming apparatus will be described in reference to FIGS. 6 and 7.

Figure 6:
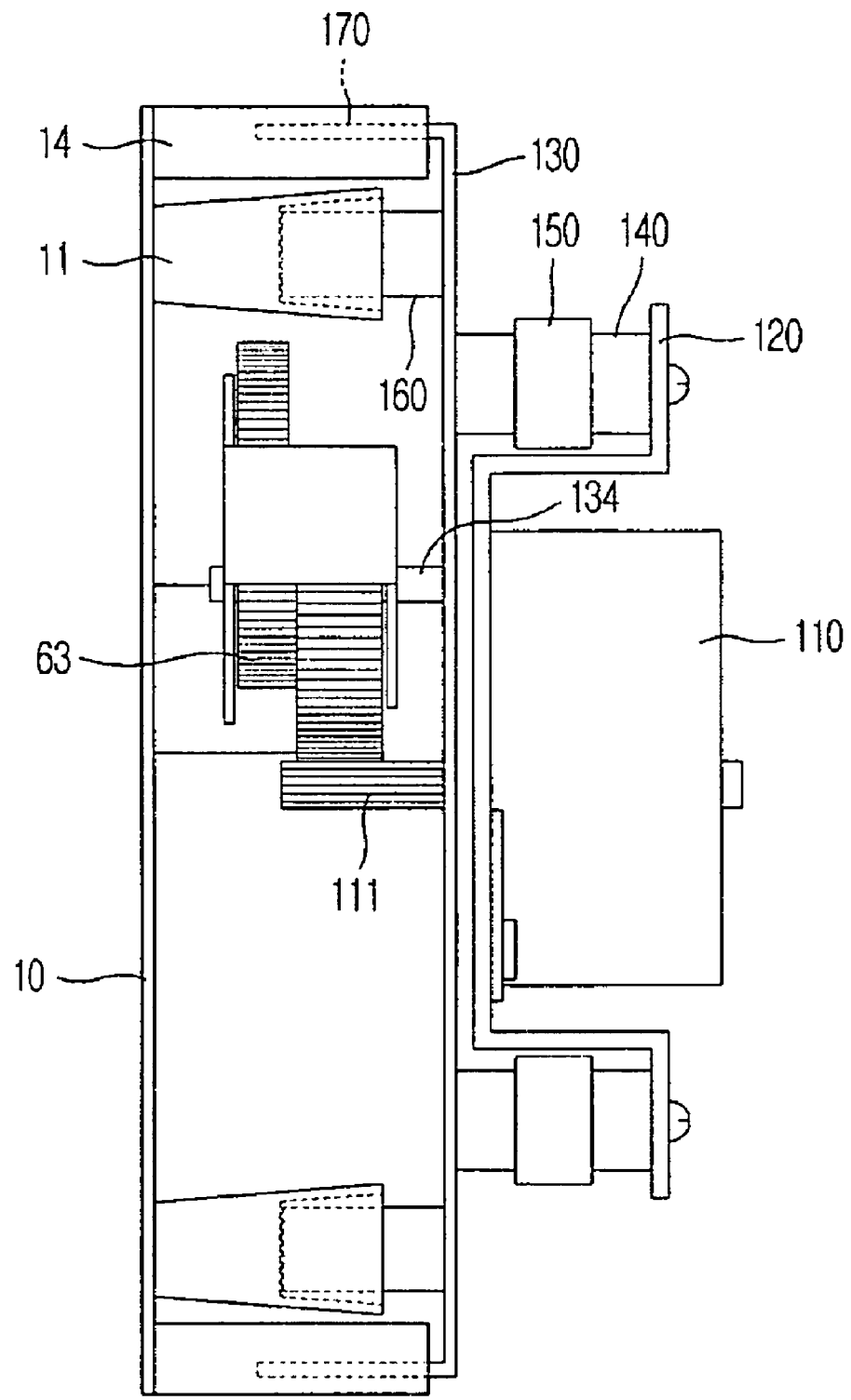
FIG. 6 is a perspective view illustrating a coupling relationship between the motor assembly and a body of the image forming apparatus in accordance with an embodiment of the invention.
Figure 7:
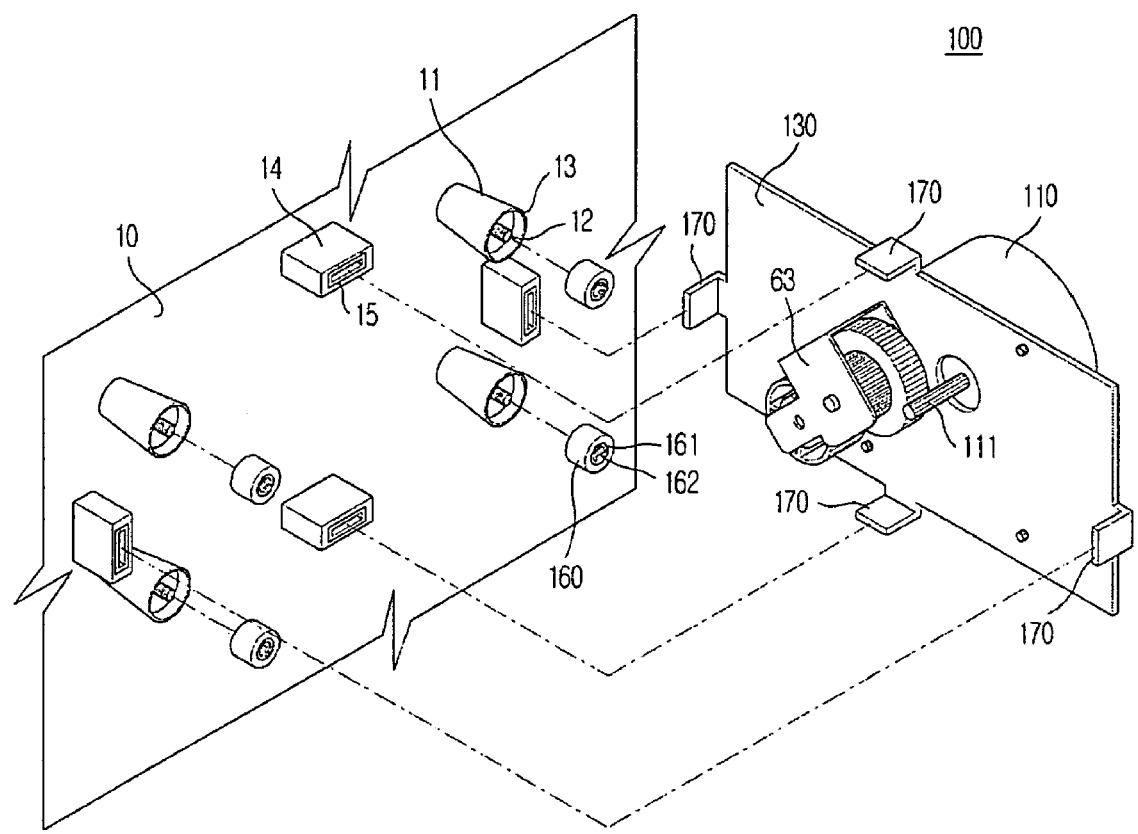
FIG. 7 is a view illustrating the motor assembly coupled to the body of the image forming apparatus in accordance with an embodiment of the invention.

FIGS. 6 and 7 illustrate a coupling relationship between the motor assembly 100 and a body 10 in accordance with an embodiment of the present invention. To prevent vibration of the motor assembly 100 from being transmitted to the body 10, second vibration-proof members 160 may optionally be arranged between the motor assembly 100 and the body 10.

Each of the second vibration-proof members 160 may have, e.g., substantially a cylindrical shape, and may include a screw fastening piece 161 provided in the center of the second vibration-proof member 160. The screw fastening piece 161 may be centrally perforated with a fastening hole 162, to allow the second vibration-proof member 160 to be screwed to the motor assembly 100 and the body 10. Preferably, to reinforce screw fastening rigidity, the screw fastening piece 161 may be made of plastic, metal, or the like, having a higher rigidity than the material of the second vibration-proof member 160, which may be made of, e.g., rubber material.

The body 10 may be provided with bosses 11, which may be coupled with the second vibration-proof members 160. The bosses 11, according to an embodiment, may be formed integrally with the body 10. Each of the bosses 11 may be formed with a screw 12. A guide 13 may protrude from a rim of the boss 11, to surround an outer circumference of the second vibration-proof member 160 to thereby maintain a stable coupling of the second vibration-proof member 160.

The second vibration-proof members 160 may be made of a relatively low rigidity material, e.g., rubber, the second vibration-proof members 160 may become deformed by a weight of the motor assembly 100. The deformation of the second vibration-proof members 160 may result in movement of the motor assembly 100 relative to the inner surface of the body 10, and consequently in unstable gear engagement and/or in generation of vibration and noise.

Accordingly, according to an embodiment, to further reduce the movement of the motor assembly 100 relative to the body 10, reinforcing pieces may be provided between the motor assembly 100 and the body 10.

Although the reinforcing pieces may be provided around or inside the second vibration-proof members similar to the reinforcing pieces provided between the motor and the fixing member, according to an embodiment, the reinforcing pieces may include protrusions 170 protruding from the fixing member 130 and holders 14 formed at the body 10 at positions corresponding to the protrusions 170 to allow the protrusions 170 to be inserted into the holders 14. Alternatively, the protrusions may be formed at the body, and the holders may be formed at the motor assembly.

According to an embodiment, by positioning the reinforcing pieces 14 and 170 at respective centers of the four rectangular sides, as, for example, shown in FIG. 7, it may be possible to reduce the motor assembly 100 from vibrating vertically and horizontally relative to the body 10.

Each holder 14 may additionally have a rubber damper 15 to attenuate vibration of the motor assembly 100.

With the above-described configuration, after the second vibration-proof members 160 are fastened to the screws 12 of the bosses 11, the motor assembly 110 is screwed to the second vibration-proof members 160, to fix the motor assembly 110 to the body 10. In this case, the protrusions 170 of the motor assembly 100 are slidably inserted into the holders 14 of the body 10, achieving firm fixing of the motor assembly 100.

Although embodiments of the present invention have been shown and described, those skilled in the art can appreciate that changes may be made to these embodiments without departing from the principles and spirit of the invention, the scope of which is defined in the claims and their equivalents.

What is claimed is:

1. An image forming apparatus having one or more drivable moving components, comprising:
   a body, in which the one or more drivable moving components are supported; and
   a motor assembly mounted to the body, the motor assembly comprising:
   a motor configured to produce a driving force for driving at least one of the one or more drivable moving components;

a fixing member mounted to the body;
a first vibration-proof member mounted to the fixing member, and supporting the motor, the first vibration-proof member having a first rigidity sufficiently low so as to reduce vibration of the motor being transmitted to the fixing member; and
a reinforcing piece having a second rigidity greater than the first rigidity, being shorter than the first vibration-proof member, and being disposed to surround an outer circumferential surface of the first vibration-proof member.

2. An image forming apparatus having one or more drivable moving components, comprising:
a body, in which the one or more drivable moving components are supported; and
a motor assembly mounted to the body, the motor assembly comprising:
a motor configured to produce a driving force for driving at least one of the one or more drivable moving components;
a fixing member mounted to the body;
a first vibration-proof member mounted to the fixing member, and supporting the motor, the first vibration-proof member having a first rigidity sufficiently low so as to reduce vibration of the motor being transmitted to the fixing member, and the first vibration-proof member including a screw fastening piece being more rigid than the first vibration-proof member, the screw fastening piece being formed with a fastening hole to allow the first vibration-proof member to be coupled to the motor and the fixing member using one or more screws; and
a reinforcing piece having a second rigidity greater than the first rigidity and being disposed in the first vibration-proof member at a position between the screw fastening piece and an outer circumference of the first vibration-proof member.

3. The image forming apparatus according to claim 2, wherein the reinforcing piece includes at least one ring-shaped member.

4. The image forming apparatus according to claim 2, wherein the reinforcing piece includes at least one shim-shaped member.

5. The image forming apparatus according to claim 1, wherein the motor assembly further comprises:
a bracket to which the motor is mounted, and
wherein the first vibration-proof member is located between the bracket and the fixing member such that bracket is spaced apart from the fixing member.

6. The image forming apparatus of claim 5, wherein the bracket comprises:
a bottom portion on which the motor is mounted; and
a stepped portion that includes a wall portion and a bent portion, the wall portion extending orthogonally from the bottom portion to a first distance from the bottom portion to the bent portion that extends parallel to the bottom portion, the first vibration-proof member being mounted to the bent portion, and having a length longer than the first distance so that the bottom portion of the bracket is spaced apart from the fixing member.

7. The image forming apparatus according to claim 1, wherein the fixing member comprises a shaft hole for accepting a rotating shaft of the motor and a gear fixing portion by which a gear to be engaged with the rotating shaft of the motor is supported.

8. The image forming apparatus according to claim 1, further comprising:
a second vibration-proof member mounted to the fixing member, second vibration-proof member being supported by the body, the second vibration-proof member having a sufficiently low rigidity so as to reduce vibration of the motor being transmitted to the body; and
a second reinforcing piece disposed between the fixing member and the body, the reinforcing piece being more rigid than the second vibration-proof member so as to limit relative movement between the body and the fixing member.

9. The image forming apparatus according to claim 8, wherein the body comprises:
at least one boss configured to receive the second vibration-proof member.

10. The image forming apparatus according to claim 9, wherein the second reinforcing piece comprises:
at least one protrusion disposed on the fixing member; and
at least one holder disposed on the body at a position corresponding to the at least one protrusion to allow the at least one protrusion to be inserted into the at least one holder.

11. The image forming apparatus according to claim 10, wherein the at least one protrusion comprises four protrusions disposed on respective center of four sides of a reticular area on the fixing member, and
wherein the at least one holder comprises four holders disposed on the body at respective positions corresponding to the four protrusions.

12. An image forming apparatus, comprising:
a body defining an outer appearance of the image forming apparatus;
a motor assembly mounted to the body, the motor assembly comprising:
a motor;
a fixing member supporting the motor;
a first vibration-proof member mounted to the fixing member, and supporting the motor, the first vibration-proof member having a sufficiently low rigidity so as to reduce vibration of the motor being transmitted to the fixing member and the first vibration-proof member being disposed at an outside of a periphery of the motor in a radial direction; and
at least one first reinforcing piece being more rigid than the first vibration-proof member so as to prevent relative movement between the body and the motor assembly, the at least one first reinforcing piece comprising:
at least one protrusion disposed on one of the fixing member and the body; and
at least one holder disposed on the other one of the fixing member and the body at a position corresponding to the at least one protrusion to allow the at least one protrusion to be inserted into the at least one holder.

13. The image forming apparatus according to claim 12, further comprising:
a second vibration-proof member mounted to the fixing member, second vibration-proof member being supported by the body, the second vibration-proof member having a sufficiently low rigidity so as to reduce vibration of the motor being transmitted to the body.

14. The image forming apparatus according to claim 12, wherein the at least one protrusion comprises four protrusions disposed on respective center of four sides of a reticular area, and wherein the at least one holder comprises four holders each disposed at respective one of positions corresponding to the four protrusions.

15. A motor assembly for driving a movable component of an image forming apparatus that includes a housing body in which the moveable component is housed, comprising:
- a motor configured to produce a driving force for driving at least one of the one or more drivable moving components;
- a fixing member mounted to the body;
- a vibration-proof member mounted to the fixing member, and supporting the motor, the vibration-proof member having a first rigidity sufficiently low so as to reduce vibration of the motor being transmitted to the fixing member and the vibration-proof member being disposed at an outside of a periphery of the motor in a radial direction; and
- a reinforcing piece disposed between the motor and the fixing member and in contact with the vibration-proof member, the reinforcing piece having a second rigidity greater than the first rigidity.

16. The apparatus according to claim 12, wherein the motor assembly further comprises:
- at least one second reinforcing piece disposed between the motor and the fixing member, the at least one second reinforcing piece being more rigid than the first vibration-proof member so as to prevent relative movement between the motor and the fixing member.

17. The apparatus according to claim 16, wherein the first vibration-proof member has a generally a cylindrical shape, the at least one second reinforcing piece being shorter than the first vibration-proof member, and being more rigid than the first vibration-proof member, the at least one second reinforcing piece comprising anyone of:
- a generally hollow cylindrical shaped member disposed to surround an outer circumferential surface of the first vibration-proof member;
- a ring-shaped member disposed in the first vibration-proof member at a position between a radial center and an outer circumference of the first vibration-proof member; and
- a shim-shaped member disposed in the first vibration-proof member, at the position between the radial center and the outer circumference of the first vibration-proof member.

18. The motor assembly according to claim 15, wherein the vibration-proof member has a generally a cylindrical shape, the reinforcing piece being shorter than the vibration-proof member, and being more rigid than the vibration-proof member, the reinforcing piece comprising anyone of:
- a generally hollow cylindrical shaped member disposed to surround an outer circumferential surface of the vibration-proof member;
- a ring-shaped member disposed in the vibration-proof member at a position between a radial center and an outer circumference of the vibration-proof member; and
- a shim-shaped member disposed in the vibration-proof member at the position between the radial center and the outer circumference of the vibration-proof member.

* * * * *